July 19, 1932.  G. BENEDETTO  1,867,935
ELECTRIC UPSETTING APPARATUS
Filed Sept. 15, 1930  3 Sheets-Sheet 1
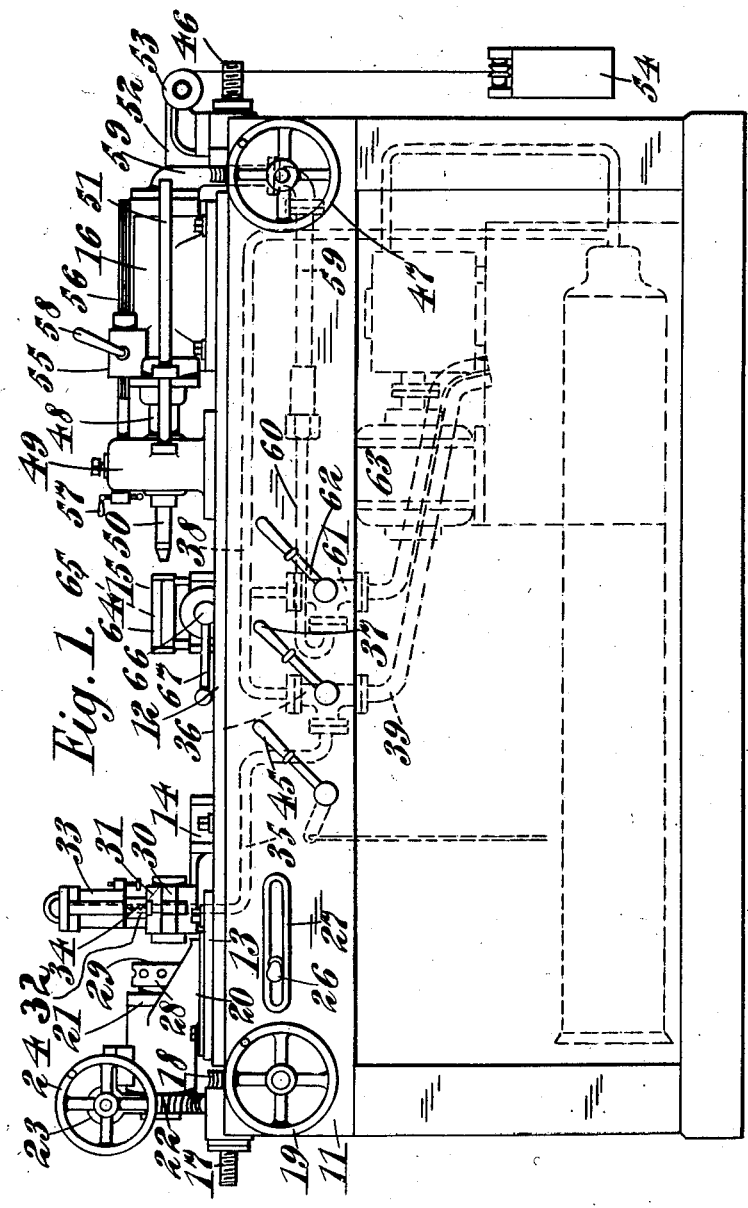
INVENTOR
Giuseppe Benedetto,
By
Watson, Coit, Morse & Grindle
Attys

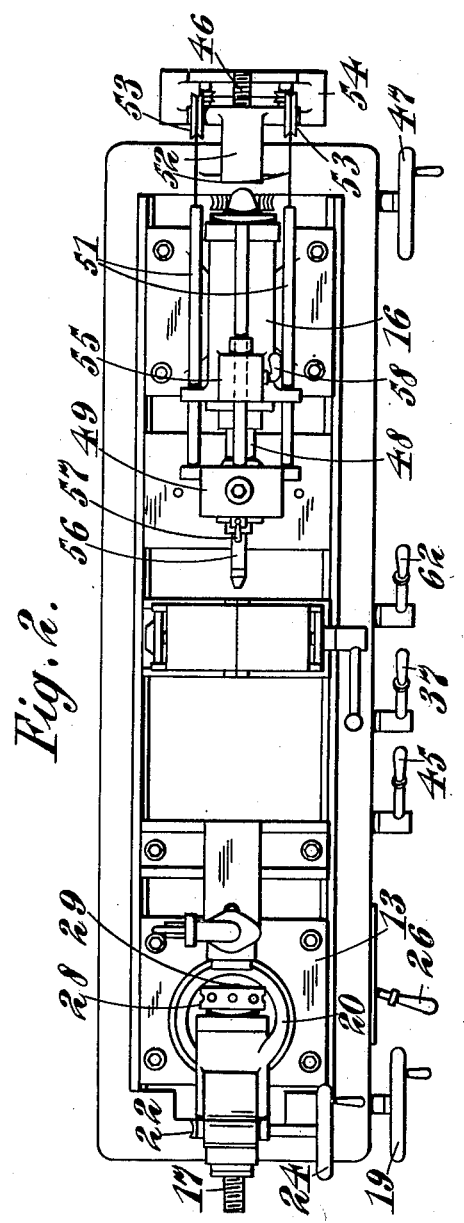

July 19, 1932.　　　G. BENEDETTO　　　1,867,935
ELECTRIC UPSETTING APPARATUS
Filed Sept. 15, 1930　　3 Sheets-Sheet 3
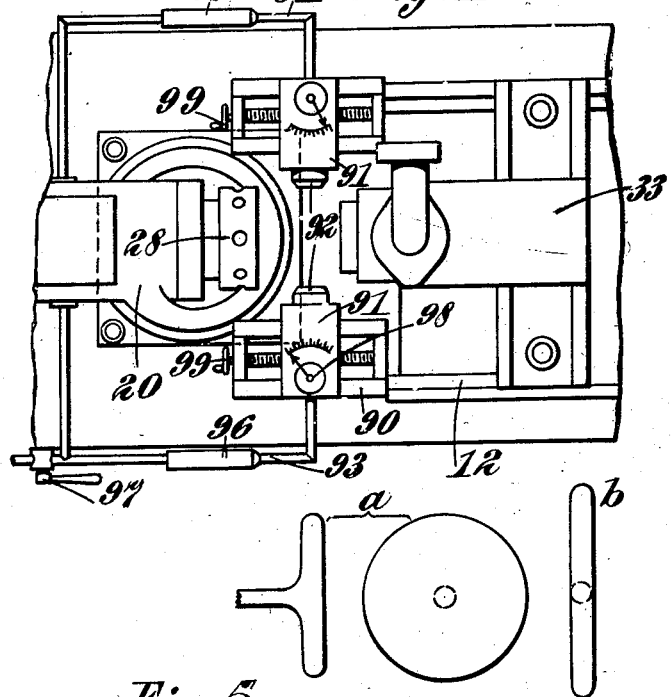
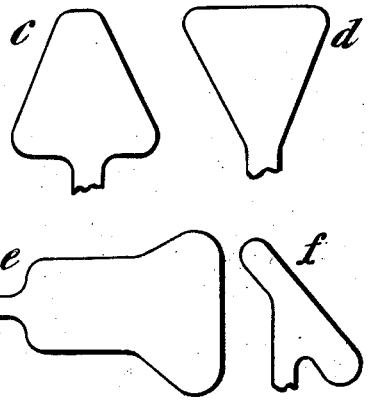
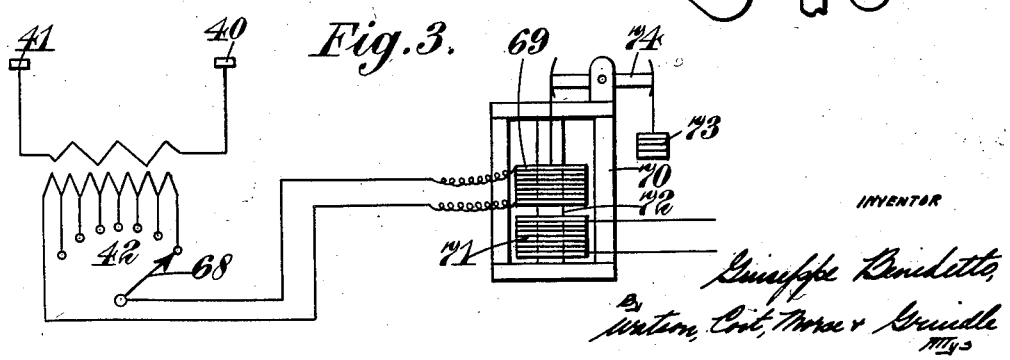

Patented July 19, 1932

1,867,935

UNITED STATES PATENT OFFICE

GIUSEPPE BENEDETTO, OF NOVARA, ITALY, ASSIGNOR TO THE OMES HOLDING COMPANY LIMITED, OF LONDON, ENGLAND, A BRITISH COMPANY

ELECTRIC UPSETTING APPARATUS

Application filed September 15, 1930, Serial No. 482,097, and in Italy September 14, 1929.

This invention comprises improvements in or relating to electric upsetting apparatus.

In electric upsetting it is known to hold a piece of work by means of a vice so that one end thereof engages an anvil and to pass an electric current through the portion of the work between the vice and the anvil from the secondary of an electric transformer so that the work becomes heated, whereafter the work or the anvil are advanced to compress the heated portion of the work and upset a head thereon. It is known that by causing the work to slide through the vice which holds it towards the anvil a larger head can be upset than if the work is held fixed in the vice and it is further known that the shape of the head can be modified by varying the distance between the vice jaws and the anvil face during the upsetting operation.

It is an object of the present invention to provide a machine for effecting electric upsetting operations in which the shape of the upset head can be modified over a wide range of desired forms and which is capable of use not only for upsetting a predetermined quantity of metal of a larger diameter than a bar but also for shaping this metal to forms hitherto not available on electric upsetting machines.

The present invention comprises in an electric upsetting apparatus the combination of an anvil, means to hold a work piece so that one end thereof abuts upon the anvil, means to pass an electric current between the work piece and the anvil, means to feed the work piece or the anvil together to effect an upsetting operation and a mounting for the anvil such that the anvil face may be moved angularly about an axis transverse to the line of feed aforesaid for the purpose described. The anvil face may be rotatable in its own plane and the introduction of this feature makes its possible to produce twisted forms during the upsetting by rotating the heated head of the work relatively to the stem. Preferably the anvil is provided with a renewable face-plate to constitute the working face and means to clamp the plate firmly in good electrical and heat-conducting contact with an anvil block behind it. The anvil block behind the central portion of the face-plate may have means for conducting cooling fluid into direct contact with the rear of the face-plate.

A further feature of the invention comprises the provision of lateral pressing members actuated by fluid pressure for the purpose of modifying the shape of the upset portion of the work.

The accompanying drawings illustrate the essential parts of an apparatus in accordance with the present invention by way of example and in the drawings:—

Figure 1 is a front elevation,

Figure 2 is a plan,

Figure 3 is a diagrammatic representation of a transformer provided with a movable bobbin and its electric connections to the apparatus shown in Figures 1 and 2, Figure 4 is a plan of a modified construction of machine showing lateral pressing or forging elements for operating upon the upset head, and Figure 5 shows various possible shapes of head which may be produced.

Referring to Figures 1 and 2 the machine comprises a frame 11 having guideways 12 along its upper surface upon which are mounted an anvil slide 13 at one end, a vice slide 14 adjacent to it, a guide vice 15 and at the other end a hydraulic ram cylinder 16. All these parts except the anvil carrier 13 are movable longitudinally along the guideways.

In the body of the anvil carrier is a vertical bearing to receive a vertical stem which carries a headstock casting 20 having a horizontal bearing having a mandrel 21. The mandrel 21 carries a wormwheel 22 at one end which is engaged by a worm operated by a hand wheel 24 mounted in bearings 23 on the headstock 20. Thus the mandrel 21 may be rotated as desired and the axis of the mandrel may be set at any angle to the guideways 12 by rotating the headstock 20 upon its vertical stem mounting in the carrier 13. Suitable means for locking the stem of the headstock 20 when set in any desired position are provided and comprises a clamping bolt 26 working in a slot 27 in the frame 11.

Within the mandrel 21 which is hollow there is mounted the stem of an anvil 28 having a working face 29 which is directed towards the right in Figure 1. The anvil 28 is made hollow and provided with water circulating connections to keep it cool, which connections are not shown in the drawings as they are of usual construction. They comprise flexible tubes for the conveyance of the cooling water to and from the movable anvil. The working face of the anvil is made removable from the main portion and is composed of a high conductivity copper-tungsten alloy of a hard and durable kind.

The anvil carrier 13 is insulated from the guideways 12 by interposed insulating material, which however, as it does not have to withstand a high electric potential may be of no great thickness provided it is capable of withstanding the heavy clamping forces necessary to secure the parts together.

The vice carrier 14 is movable along the guideways 12 under the control of a lead screw 17 which is engaged by a wormwheel 18. The wormwheel 18 is rotatable by a worm on the shaft of a handwheel 19 so that the vice carrier 14 may readily be set by the operator at any desired position on the bed of the machine relatively to the anvil.

The vice carrier comprises a fixed lower jaw 30 and a movable upper jaw 31 mounted on a stem 32 projecting from a hydraulic pressure cylinder 33. A return spring 34 is provided to draw the upper vice jaw 31 normally upwards. A pressure supply pipe 35 to the cylinder 33 is provided which is under the control of a two-way valve 36 operated by a control handle 37. By this means hydraulic pressure can be applied from a supply pipe 38 to the cylinder 33, or alternatively the cylinder may be connected through the two-way valve to an exhaust pipe 39. The vice and the carrier therefor are constructed of bronze or other high conductivity material and the same applies to the anvil headstock. These two parts are connected to the secondary terminals 40, 41 of a stepdown transformer 42 which is not shown in Figures 1 or 2 but appears in the connection diagram Figure 3. The transformer may conveniently be located in the base of the machine. A main control switch 44 is provided for the transformer and this is linked by suitable operative connections to a switch control handle 45.

The hydraulic ram cylinder 16 is movable along the guideways 12 by a lead screw 46 and the longitudinal movement is controlled by a handwheel 47 similarly to the handwheel 19 which controls the longitudinal movement of the vice carrier 14. The cylinder 16 operates a ram 48 which engages a cross head 49, mounted to slide along the guideways 12. The cross head 49 carries an interchangeable ram 50 which is intended to abut upon the end of a workpiece held in the vice jaws 30, 31 so that the other end thereof abuts upon the working face 29 of the anvil. The cross head 49 carries slide bars 51 which are attached to cables 52 passing over pulleys 53 and which at their other ends are secured to a counterweight 54. The counterweight 54 not only serves to draw the ram 50 backward when hydraulic pressure is cut off from the cylinder 16 but also serves a second useful purpose in that it ensures that there is no backlash in the operative connections between the handwheel 47 and the cylinder 16.

Upon the upper side of the cylinder 16 is a lug 55 which is screw-threaded to receive a screw 56. The screw 56 passes freely through the cross head 49 to an operating handle 57. A locking handle 58 is provided which can be screwed against a flat or keyway cut in the side of the screw 56 to hold the latter in any position to which it has been adjusted. The effect of this arrangement is that when the cross head 49 reaches the handle 57 in the course of its forward movement it is positively restrained from further movement by the abutment afforded by the head of the screw 56 to which the handle 57 is secured. Thus the ram 48 can be set to execute a pre-determined stroke.

Hydraulic pressure is supplied to the cylinder 16 through a supply pipe 59 having a telescopic section 60 attached to a two-way valve 61. The two-way valve 61 is controlled by a handle 62 and receives hydraulic pressure from the pipe 38 while it is provided with an exhaust connection 63.

Between the vice carrier 14 and the ram 50 there is located a guide vice 15. The guide vice 15 is not operated and comprises a pair of horizontally movable jaws 64, 65 actuated by a right and left hand screw on the spindle 66 of a hand lever 67. The guide vice may be removed from the machine if short pieces of work are under treatment but for long pieces of work it grips the work close to the ram 50 and holds it central with the end of the ram.

Turning to Figure 3 this comprises a low tension step down transformer 42 as already referred to the secondary of which is connected by the terminal 40, 41 to the vice and the anvil respectively so that it can supply electric current to heat the work between the vice and the anvil. The primary of the transformer 42 is provided with a number of tappings operated by a hand switch 68 and is connected to a movable secondary winding 69 of a control transformer 70. The primary winding 71 of the control transformer is connected to the source of electric supply.

The secondary winding 69 is mounted so as to slide freely on a vertical magnetic core 72 and its weight is partly counterbalanced by a counterweight 73 connected to the winding through a balance beam 74. The weight 73 is not adequate to overcome the weight of the secondary winding 69 but only partially to balance it and thus the natural repulsion between the primary 71 and the secondary 69 becomes, at a certain predetermined current, dependent upon the effect of the balance weight 73, adequate to overcome the unbalanced weight of the secondary 69 and to force the latter upwards, thus increasing the leakage between the primary and secondary and reducing the secondary voltage.

In operation of the machine a workpiece is placed between the ram 50 and the anvil 29 being gripped by the vice jaws 30, 31 and if necessary additionally supported by the vice jaws 64, 65. In order to bring the ram 50 into contact with the work the cylinder 16 may be initially adjusted along the guideways by the handwheel 47. The vice carrier 14 is set at such a distance from the anvil face 29 as to allow room for the head which it is desired to form upon the work. Current is then switched on by the handle 45 and hydraulic pressure is applied to the cylinder 16 by operating the handle 62. As soon as the work becomes sufficiently heated by the electric current the ram 50 forces the work through the vice jaws with a sliding action and upsets a head between the anvil 29 and the vice jaws. The operation of the transformer 70 prevents overheating of the work at the neck between the vice jaws and the upset head, which would otherwise occur owing to the reduction of resistance which takes place when the section of the metal is increased by the upsetting operation. The current can further be hand-controlled by the handle 68 if desired but generally speaking this handle needs only to be set at a different position for different sizes of work, a corresponding alteration in the counterweight 73 being effected if desired.

The combination of the movable bobbin transformer and an electric upsetting machine is not claimed herein but forms the subject of a separate United States patent application No. 481,334.

By rotating the working face of the anvil 29 about a vertical axis it can be set to various degrees of inclination to the line of advance of the workpiece and located in this position by the bolt 26. This permits of the formation of lopsided or angularly inclined heads. Moreover the anvil face may be rotated in its own plane by operating the handwheel 24 during or after the upsetting operation. This permits of the production of various twisted shapes. The working face of the anvil may be recessed moreover to further shape the head of the work.

Referring to Figure 5 the detail a shows a flattened form of head which can be produced by causing the anvil to approach the vice jaws 30, 31 as the head is upset by the forcing of the work through the jaws. If the vice is initially at a greater distance from the anvil than that shown in the figure and the anvil is approached towards the vice at a suitable speed the work becomes of a larger size where it is close to the vice jaws than where it abuts upon the anvil similarly to the shape c Figure 5. If on the other hand the anvil is caused to recede rapidly from the vice after an initial dwell the shape of the work may approximate to that shown at d. The shape shown at e is obtained by causing the anvil initially to dwell close to the vice and subsequently to retreat at a uniform speed. The shape shown at f is one of those which can be obtained by setting the anvil at an angle to the line of advance of the work.

Referring to Figure 4 which is a modified construction, this shows a vice 33 similar to the vice 33 of Figure 1 and an anvil headstock 20 carrying an anvil head 28 similar to the correspondingly numbered parts of Figure 1. At each side of the guideways 12 there are disposed subsidiary guideways 90 upon which work carriers 91 for lateral pressing members 92. The lateral pressing members are operated by hydraulic cylinders located within the carriers 91 and supplied by fluid pressure pipes 93, 94 through telescopic joints 95, 96 under the control of a valve 97. Pressure reducing valves 98 are interposed between the cylinders and the supply pipes 93, 94 so that the lateral force exerted by the rams 92 may be separately adjusted. Moreover the rams may be provided with any desired shape of working face, recessed, concave or convex so that they act as swage blocks. The carriers 91 may be adjusted to any desired position along the guideways 90 by lead screws 99. Thus at any time during or after the upsetting operation lateral pressure to a regulated extent may be applied to one or both sides of the upset head to forge it to any desired shape. One shape which may be produced is shown at b Figure 5 where the upset head has been pressed laterally into a flat sided formation. Forgings such as eye-bolts may thus readily be produced in a single operation from a piece of material no larger than the shank of the eye-bolt.

I claim:—

1. In an electric upsetting apparatus the combination of an anvil, means to hold a workpiece so that one end thereof abuts upon the anvil, means to pass an electric current between the work piece and the anvil, means to feed the work piece and the anvil together to effect an upsetting operation and a mounting for the anvil such that the anvil face may be moved angularly about an axis transverse to the line of feed aforesaid.

2. In an electric upsetting apparatus the combination of an anvil, means to hold a workpiece so that one end thereof abuts upon the anvil, means to pass an electric current between the workpiece and the anvil, means to feed the workpiece and the anvil together to effect an upsetting operation and a mounting for the anvil such that the anvil face may be moved angularly about an axis transverse to its own plane.

3. In an electric upsetting apparatus the combination of an anvil, means to hold a workpiece so that one end thereof abuts upon the anvil, means to pass an electric current between the workpiece and the anvil, means to feed the workpiece and the anvil together to effect an upsetting operation and a mounting for the anvil such that the anvil face may be moved angularly about an axis at right angles to its own plane.

4. In an electric upsetting apparatus the combination of an anvil, means to hold a workpiece so that one end thereof abuts upon the anvil, means to pass an electric current between the workpiece and the anvil, means to feed the workpiece and the anvil together to effect an upsetting operation, a mounting for the anvil such that the anvil face may be moved angularly about an axis transverse to its own plane and means to conduct cooling fluid to the interior of the anvil close behind the working face thereof.

5. In an electric upsetting apparatus the combination of an anvil, means to hold a workpiece so that one end thereof abuts upon the anvil, means to pass an electric current between the work piece and the anvil, means to feed the workpiece and the anvil together to effect an upsetting operation and a mounting for the anvil such that the anvil face may be moved angularly about an axis transverse to the line of feed aforesaid and also moved angularly about an axis transverse to its own plane.

6. In an electric upsetting apparatus the combination of an anvil, means to hold a workpiece so that one end thereof abuts upon the anvil, means to pass an electric current between the workpiece and the anvil, means to feed the workpiece and the anvil together to effect an upsetting operation, pressing members located to one side of the line of feed of the workpiece toward the anvil, and movably mounted for movement transverse to said line of feed so as to be capable of engaging and deforming the sides of the upset head and means for advancing said lateral pressing members upon the upset head.

7. In an electric upsetting apparatus the combination of an anvil, means to hold a workpiece so that one end thereof abuts upon the anvil, means to pass an electric current between the workpiece and the anvil, means to feed the workpiece and the anvil together to effect an upsetting operation, pressing members located to one side of the line of feed of the workpiece toward the anvil, and movably mounted for movement transverse to said line of feed so as to be capable of engaging and deforming the sides of the upset head and fluid-pressure operating means for advancing said pressing members when desired.

8. In an electric upsetting apparatus the combination of an anvil, vice-jaws to hold a workpiece so that it abuts upon the anvil head to permit sliding movement of the work through the vice head, means to pass an electric current between the vice jaws and the anvil through the workpiece to heat the same, a fluid-pressure operated ram to force the workpiece through the vice jaws towards the anvil and adjustable stop means to automatically limit advance movement of the ram.

9. In an electric upsetting apparatus the combination of an anvil, vice-jaws to hold a workpiece so that it abuts upon the anvil head to permit sliding movement of the work through the vice head, means to pass an electric current between the vice jaws and the anvil through the workpiece to heat the same, a fluid-pressure operated ram to force the workpiece through the vice jaws towards the anvil, adjustable stop means to automatically limit advance movement of the ram and a mounting for the anvil such that the anvil face may be moved angularly about an axis transverse to the line of feed of the ram.

10. In an electric upsetting apparatus the combination of an anvil, vice-jaws to hold a workpiece so that it abuts upon the anvil head to permit sliding movement of the work through the vice head, means to pass an electric current between the vice jaws and the anvil through the workpiece to heat the same, a fluid-pressure operated ram to force the workpiece through the vice jaws towards the anvil, adjustable stop means to automatically limit advance movement of the ram and a mounting for the anvil such that the anvil face may be moved angularly about an axis transverse to the line of feed of the ram and also moved angularly about an axis transverse to its own plane.

In testimony whereof I affix my signature.

GIUSEPPE BENEDETTO.